Patented Oct. 4, 1949

2,483,420

UNITED STATES PATENT OFFICE 2,483,420

PURIFICATION OF ISOQUINOLINE

Harry A. Kjellman, Jr., Steubenville, Ohio, assignor to Koppers Co., Inc., Pittsburgh, Pa., a corporation of Delaware No Drawing. Application March 8, 1946, Serial No. 653,119

7 Claims. (Cl. 260—283)

This invention relates to the purification of isoquinoline. More particularly the invention relates to the separation of impurities associated with crude isoquinoline by freezing to obtain a pure isoquinoline.

The chemical handbooks define the freezing point of isoquinoline as 24.6° C. Some highly purified samples of isoquinoline obtained in accordance with the present invention have a freezing point of 25° C.

Isoquinoline is found in tars made by the dry distillation of coke, particularly in byproduct coke ovens and in gas making retorts. Generally quinoline homologues are associated with isoquinoline in these tars. For example quinaldine, alphamethyl quinoline, is usually found in coal tars and has a boiling point of 243° C. and melting point of −1° C., whereas isoquinoline has a boiling point of 240° C. and a melting point of 24.6° C. Other homologues of quinoline are often found in coal tar in addition to isoquinoline and quinaldine. The fractionation of the crude isoquinoline in a very efficient bubble cap distillation tower will produce an isoquinoline fraction having a maximum freezing point of about 12° C.

I have now found that isoquinoline, particularly the isoquinoline derived from coal tar may be refined by freezing the crude product to obtain a substantially pure isoquinoline.

The primary object of the present invention is to provide a method of purifying isquinoline.

Another object of the invention is to provide a method of separating pure isoquinoline from crude isoquinoline by freezing.

With these and other objects in view, the invention consists in the improved method of purifying isoquinoline hereinafter described and particularly defined in the claims.

In the refining of tar, an isoquinoline fraction is separated in an efficient bubble tower to get a crude isoquinoline product having a melting point of between 8° and 12° C. This crude isoquinoline may be further purified by freezing. To accomplish this, the crude isoquinoline is cooled to a temperature of approximately −2° C. This cooled product forms a mush or slush which is semi-fluid, the isoquinoline being the crystallized product and the isoquinoline homologues, such as quinaldine being in liquid form. The mush obtained by freezing is generally introduced into the centrifugal apparatus at a lower temperature than the centrifugal bowl so the cooler isoquinoline and quinaldine products will not solidify in the various parts of the centrifuge. The isoquinoline mush is held under centrifugal force for a period of three minutes to half an hour for the purpose of separating the liquid impurities therefrom. The isoquinoline remains as a solidified mass in the centrifuge and preferably is removed and melted. Whereupon it may be frozen again to a temperature of about −2° C. and then subjected to centrifugal force for a second time.

Isoquinoline which has been subjected to two or three recrystallizations has been found to be very pure and free of those impurities which reduce its melting point. In fact I have been able to make isoquinoline with a melting point of 25° C. by the method outlined above.

Using a 12° C. melting point crude isoquinoline as raw material, I have found that the yield of pure isoquinoline having a melting point above 20° C. is about 45% to 50% of the crude product.

The mother liquor which is separated from the isoquinoline crystals contains considerable isoquinoline and the major portion of the isoquinoline may be extracted from the mother liquor by freezing the mother liquor to a temperature of −10° to −20° C. This low temperature will make a practically solid mass and it is sometimes necessary to heat the mass to obtain a semi-fluid slush before centrifuging the mass to extract the mother liquor. The isoquinoline thus obtained is not pure and preferably is added to the crude 12° melting point isoquinoline for refining with it in accordance with the process outlined above.

With the process outlined herein, a 20° to 23° C. melting point isoquinoline may be obtained by a single freezing and extraction operation. However, it is preferred to use two or three freezing and centrifugal extracting operations to obtain an isoquinoline having a melting point of 24° to 25° C.

The preferred form of the invention having been thus described what is claimed as new is:

1. A method of purifying isoquinoline to obtain an isoquinoline having a melting point above 20° C. comprising: drying the crude isoquinoline, distilling the crude isoquinoline to obtain a distillate having a freezing point of 8° to 12° C., cooling the dry distilled product to a temperature slightly below 0° C. to solidify the isoquinoline and form a semi-fluid mass, and extracting mother liquor from the solidified isoquinoline product.

2. A method of purifying isoquinoline to obtain an isoquinoline of a melting point above 20° C. comprising: drying and distilling crude isoquinoline to obtain a distillate having an 8° to 12° C. freezing point, cooling the dried crude isoquinoline distillate to a temperature slightly below 0° C. to solidify the isoquinoline and to form a semi-fluid mass, and subjecting the semi-fluid to centrifugal action to extract mother liquor therefrom.

3. A method of purifying isoquinoline to obtain an isoquinoline having a melting point above 20° C. comprising: cooling a dried crude isoquinoline having an 8° to 12° C melting point to a temperature slightly below 0° C. to solidify isoquinoline therein and to form a semi-fluid mass, subjecting the semi-fluid mass to centrifugal action to extract mother liquor therefrom, melting and refreezing the purified isoquinoline to a temperature below 0° C. to crystallize the isoquinoline and form a semi-fluid mass, and centrifugally extracting mother liquor from the partially purified mass.

4. The method defined in claim 1 in which the dried product is cooled to approximately −2° C.

5. The method defined in claim 3 in which the first freezing operation is carried out at a temperature of −2° C. and the refreezing operation is carried out at a temperature between −2° C. and 0° C.

6. The method defined in claim 2 in which the solidified semi-fluid mass has its temperature raised to 5° to 10° C. before being subjected to centrifugal extraction.

7. The method defined in claim 1 in which the mother liquor extracted from the semi-fluid mass is again cooled to a temperature of −10° to −20° C. to solidify isoquinoline therein, the mass then being warmed to a temperature of 5° to 10° C. and subjected to centrifugal force to separate the isoquinoline from mother liquor, and returning the isoquinoline thus extracted to the crude isoquinoline being treated, for further purification.

HARRY A. KJELLMAN, Jr.

REFERENCES CITED

The following references are of record in the file of this patent:

UNITED STATES PATENTS

| Number | Name | Date |
|---|---|---|
| 2,402,158 | Glowacki et al. | June 18, 1946 |